(12) United States Patent
Choi et al.

(10) Patent No.: US 11,283,307 B2
(45) Date of Patent: Mar. 22, 2022

(54) WIRELESS POWER TRANSMITTING DEVICE

(71) Applicant: LG Electronics Inc., Seoul (KR)

(72) Inventors: Hyengcheul Choi, Seoul (KR); Eunsoo Lee, Seoul (KR); Jaesoon Kwon, Seoul (KR); Hwanyong Kim, Seoul (KR); Sooyong Park, Seoul (KR); Seong Hun Lee, Seoul (KR); Beom Seok Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 16/686,041

(22) Filed: Nov. 15, 2019

(65) Prior Publication Data
US 2020/0161906 A1    May 21, 2020

(30) Foreign Application Priority Data

Nov. 16, 2018 (KR) ......................... 10-2018-0142104

(51) Int. Cl.
*H02J 7/00* (2006.01)
*H02J 50/80* (2016.01)
*H02J 7/02* (2016.01)

(52) U.S. Cl.
CPC .......... *H02J 50/80* (2016.02); *H02J 7/00036* (2020.01); *H02J 7/025* (2013.01)

(58) Field of Classification Search
CPC .. H02J 50/12; H02J 50/80; H02J 50/90; H02J 50/70; H02J 7/025; H02J 50/60; H02J 50/50; H02J 50/40; H02J 50/005; H02J 50/10; H02J 7/0042; H02J 5/005; H02J 7/00; H02J 7/0047; H02J 7/0044; H02J 7/0013; H02J 7/0027; H02J 7/0029;
(Continued)

(56) References Cited

U.S. PATENT DOCUMENTS

2011/0128015 A1   6/2011   Dorairaj et al.
2015/0042171 A1   2/2015   Kohara et al.
(Continued)

FOREIGN PATENT DOCUMENTS

EP    2317625    5/2011
EP    2824798    1/2015
(Continued)

OTHER PUBLICATIONS

Extended European Search Report in European Application No. 19204279 .4, dated Jan. 2, 2020, 8 pages.

*Primary Examiner* — Binh C Tat
(74) *Attorney, Agent, or Firm* — Fish & Richardson P.C.

(57) ABSTRACT

Disclosed herein is a wireless power transmitting device that includes a charging module which is configured to transmit a foreign object sensing signal for sensing at least one of a wireless power receiving device and a foreign object on a charging pad, and which is configured to transmit a wireless power signal for charging the wireless power receiving device, and a control module which is configured to control the charging module such that the wireless power signal and the foreign object sensing signal are transmitted, and which is configured to sense at least one of the foreign object and the wireless power receiving device, based on an output voltage sensed by the charging module, after the foreign object sensing signal is transmitted.

19 Claims, 8 Drawing Sheets

(58) Field of Classification Search
CPC ...... H02J 50/402; H02J 7/00034; H02J 7/045;
H02J 7/00036; H02J 7/00304; H02J
50/20; H02J 7/00309; H02J 2310/22;
H02J 7/00302; H02J 50/502; H02J 50/05;
H02J 2310/48; H02J 7/00045; H02J 7/35;
H02J 2310/40; H02J 7/00714; H02J 7/02;
H02J 7/00308; H02J 3/322; H02J 50/00;
H02J 50/23; H02J 7/00047; H02J
2207/40; H02J 7/0048; H01F 5/003;
H01F 38/14; H01F 27/2823; H03H 7/40
USPC .................................................. 320/106–115
See application file for complete search history.

(56) References Cited

U.S. PATENT DOCUMENTS

| | | | |
|---|---|---|---|
| 2015/0349541 A1 | 12/2015 | Yamamoto et al. | |
| 2015/0349542 A1 | 12/2015 | Yamamoto et al. | |
| 2016/0241075 A1* | 8/2016 | Von Novak, III | H02J 50/10 |
| 2017/0063130 A1* | 3/2017 | Sultenfuss | H02J 7/042 |
| 2017/0288412 A1 | 10/2017 | Yamamoto et al. | |
| 2018/0174745 A1* | 6/2018 | Percebon | H02J 50/10 |
| 2018/0248408 A1 | 8/2018 | Chen | |
| 2019/0148983 A1 | 5/2019 | Kozakai et al. | |

FOREIGN PATENT DOCUMENTS

| | | |
|---|---|---|
| EP | 2950415 | 12/2015 |
| WO | WO2017086804 | 5/2017 |
| WO | WO2018020885 | 2/2018 |

* cited by examiner

WIRELESS POWER TRANSMITTING DEVICE

CROSS-REFERENCE TO RELATED APPLICATION

This application claims priority to and the benefit of Korean Patent Application No. 10-2018-0142104 filed on 16 Nov. 2018 and, the disclosure of which is incorporated herein by reference in its entirety.

BACKGROUND

1. Field of the Invention

The present disclosure relates to a wireless power transmitting device that may readily sense at least one of the foreign object and wireless power receiving device.

2. Description of Related Art

Wireless power transmission (or wireless energy transfer) is a technology of wirelessly transmitting electric energy from a transmitter to a receiver using magnetic induction.

Since the 1800s, electric motors or transformers to which the theory of electromagnetic induction is applied have been used in the technology of wireless power transmission. Since then, electromagnetic waves such as high frequencies, microwaves, lasers and the like have been used to transmit electric energy.

Electric toothbrushes or some cordless electric shavers that are usually used are charged on the basis of electromagnetic induction.

Methods for wirelessly delivering energy may be largely classified into a magnetic induction method, an electromagnetic resonance method, a radio frequency (RF) transmission method using short-wavelength radio frequencies, and the like.

The technology of wireless power transmission may be used in a wide range of industries such as the mobile industry, the IT industry, the railway industry, the home appliance industry and the like.

When a conductor, i.e., a foreign object (FO), instead of a wireless power receiving device, exists in an area in which wireless charging is possible, electromagnetic signals emitted from a wireless power transmitter are induced into the foreign object (FO), and temperature of the foreign object may increase. For instance, the foreign object may include a coin, a clip, a pin, a ballpoint pen and the like.

If a foreign object (FO) exists between a wireless power receiver and a wireless power transmitter, efficiency of wireless charging is significantly reduced, and temperature around the foreign object (FO) increases. Thus, temperature of the wireless power receiver and wireless power transmitter also increases. When the foreign object (FO) in a charging area is not removed, electric power may be wasted, and the wireless power transmitter and wireless power receiver may be damaged due to overheat.

In US Patent Application Publication No. 2015-0276965 (published on Oct. 1, 2015), a metallic foreign object detecting system for an inductive transmitting system is disclosed, as a related art.

Figure 1:
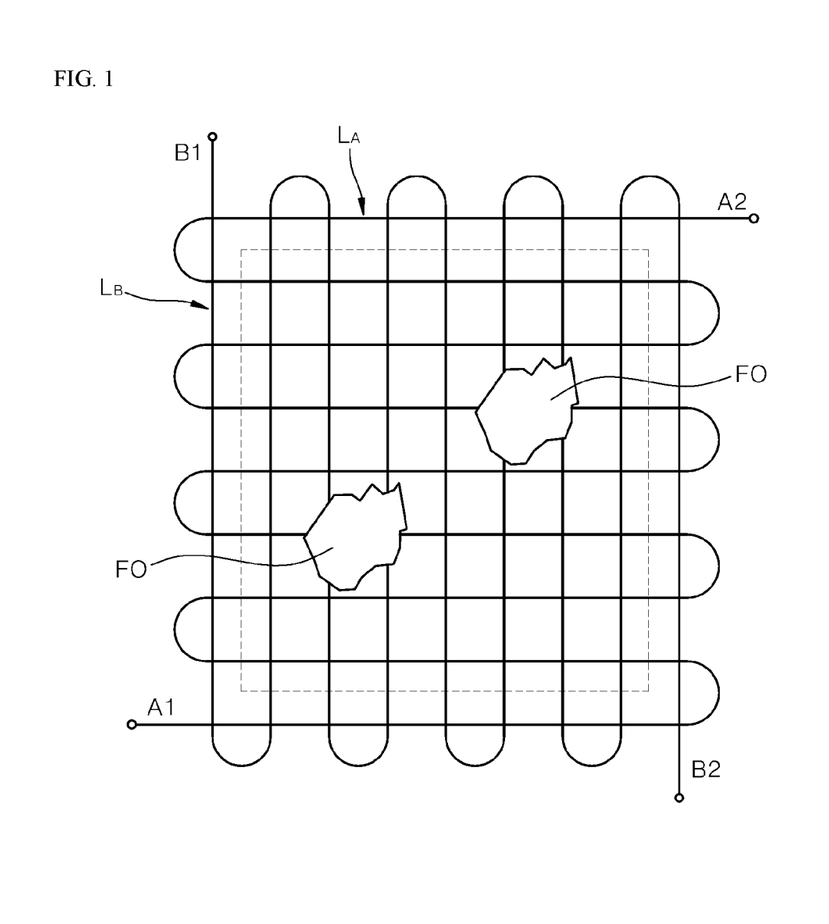
FIG. 1 is a view illustrating a coil of a detector according to a conventional foreign object detecting system.

FIG. 1 is a view illustrating a coil of a detector according to a conventional foreign object detecting system.

Referring to FIG. 1, in each of the coils (LA, and LB) of the detector, a coil is arranged in zigzag. The coils (LA, and LB) of the detector may be arranged crosswise.

In this case, if a foreign object is placed, inductance occurs in the coils (LA, and LB) of the detector. The detector that connects with both ends of the coils (LA, and LB) of the detector may detect the foreign object (FO) based on a change in amounts of inductance. According to a conventional technology, a foreign object (FO) may be detected, but the location of a foreign object (FO) may be rarely detected.

In recent years, research into technology of exactly detecting the location of a foreign object (FO) has been performed in the field of wireless charging.

SUMMARY OF THE INVENTION

One aspect of the present disclosure is to provide a wireless power transmitting device that may sense a location of at least one of the foreign object and wireless power receiving device.

Another aspect of the present disclosure is to provide a wireless power transmitting device that may sense at least one of the foreign object and wireless power receiving device based on a change in output voltages of at least one of the foreign object and wireless power receiving device on a charging pad.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

A wireless power transmitting device according to the present disclosure may allow a charging module to transmit a foreign object sensing signal and a wireless power signal that have different resonance values, and may sense at least one of the foreign object and the wireless power receiving device based on an output voltage of the foreign object sensing signal.

A wireless power transmitting device according to the present disclosure may include a resonance varying unit that varies resonance values of the charging module, thereby sensing a foreign object while a wireless charging receiving device is being charged.

A wireless power transmitting device according to the present disclosure may further include a resonance loop between a transmitting coil and a charging pad, thereby increasing sensitivity to an output voltage (Vout).

The wireless power transmitting device may sense at least one of the foreign object and the wireless power receiving device on a charging pad, based on a foreign object sensing signal transmitted by a charging module.

The wireless power transmitting device may transmit at least one of the wireless power signal and the foreign object sensing signal by varying resonance values of the charging module. Thus, an additional coil for sensing a foreign object is not required, manufacturing costs may be decreased, and a manufacturing process may be simplified.

The wireless power transmitting device may transmit a foreign object sensing signal to the wireless power receiving device on the charging pad at set time-period intervals while a wireless power signal is being transmitted, to sense whether a foreign object is placed on the charging pad. Thus, a foreign object may be sensed in real time, and overheat may be prevented, thereby improving credibility of the wireless power transmitting device.

Detailed effects of the present disclosure are described below together with to the above-described effects in the detailed description of the disclosure.

DETAILED DESCRIPTION OF THE INVENTION

The above-described objectives, features and advantages are specifically described hereunder with reference to the attached drawings. Accordingly, one having ordinary skill in the art may readily implement the technical spirit of the present disclosure. Further, in describing the present disclosure, publicly-known technologies in relation to the disclosure are not specifically described if they are deemed to make the gist of the disclosure unnecessarily vague.

Below, embodiments are described with reference to the attached drawings. In the drawings, identical reference numerals denote identical or similar elements.

Embodiments of a wireless power transmitting device are described hereunder.

Figure 2:
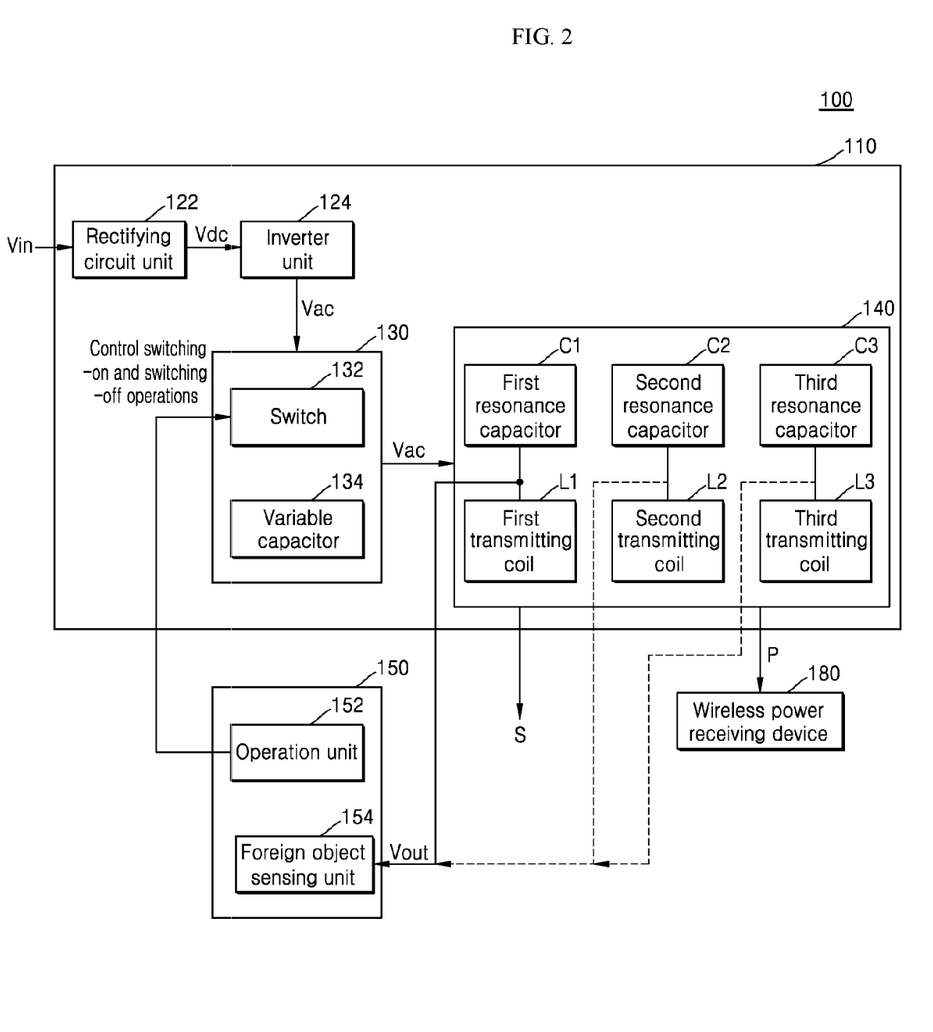
FIG. 2 is a block diagram illustrating a configuration of control of a wireless power transmitting device according to the present disclosure.

FIG. 2 is a block diagram illustrating a configuration of control of a wireless power transmitting device according to the present disclosure.

Referring to FIG. 2, the wireless power transmitting device 100 may include a charging module 110 and a control module 150.

The charging module 110 may include a rectifying circuit unit 122, an inverter unit 124, a resonance varying unit 130 and a transmitting unit 140.

The rectifying circuit unit 122 may rectify alternating current input power (Vin) that is input from an external power source (invisible) into direct current power (Vdc). In this case, the rectifying circuit unit 122 may include at least one diode. For instance, the rectifying circuit unit 122 may be implemented as any one of a half-wave rectifying circuit, a full-wave rectifying circuit, a bridge full-wave rectifying circuit, and a power factor correction (PFC) circuit.

In the embodiment, the rectifying circuit unit 122 may not be used when direct current input power (Vin) is input.

The inverter unit 124 may convert direct current power (Vdc) into alternating current-type driving power (Vac). That is, the inverter unit 124 may include at least one switching device. Additionally, at least one switching device may repeat turning on and turning off on the basis of a predetermined driving frequency. At least one switching device, for instance, may include an IGBT device, an FET device, and the like.

The resonance varying unit 130 may be placed between the inverter unit 124 and the transmitting unit 140.

The resonance varying unit 130 may include a switch 132 and a variable capacitor 134.

The switch 132 may switch on and switch off on the basis of control by the control module 150. When the switch 132 switches on, the switch 132 may deliver driving power (Vac) that is output from the inverter unit 124 to the transmitting unit 140.

Additionally, when the switch 132 switches off, the variable capacitor 134 may vary a frequency of driving power (Vac) that is output from the inverter unit 124. That is, the variable capacitor 134 may vary a resonance value of the transmitting unit 140.

The variable capacitor 134 may connect with the switch 132 in parallel. Accordingly, on the basis of the switching on and switching off of the switch 132, the variable capacitor 134 may transmit a wireless power signal (P) transmitted by a first resonance value of the switch 132 as a foreign object sensing signal varied by a second resonance value.

When the switch 132 switches on, and driving power (Vac) that is output from the inverter unit 124 is input, the transmitting unit 140 may transmit a wireless power signal (P) to a wireless power receiving device 180 that is placed on a charging pad.

To transmit a wireless power signal (P), the transmitting unit 140 may include at least one or more of transmitting coils (L1, L2, and L3), and at least one or more of resonance capacitors (C1, C2, and C3).

In this case, the transmitting coil (L1, L2, and L3) and the resonance capacitor (C1, C2, and C3) may be respectively implemented as any one of a series resonance circuit, a parallel resonance circuit, and a series and parallel resonance circuit.

Each of the transmitting coils (L1, L2, and L3) may transmit a wireless power signal (P) that has a first resonance value, by the driving power (Vac) and capacitance of the resonance capacitor (C1, C2, and C3).

FIG. 2 illustrates a transmitting unit 140 that includes three transmitting coils (L1, L2, and L3) and three capacitors (C1, C2, and C3). However, the number of the transmitting coils and capacitors is not restricted.

Additionally, when the switch 124 switches off and connects with the variable capacitor 134, the transmitting unit 140 may transmit a foreign object sensing signal (S) that has a second resonance value varied from the first resonance value.

That is, the transmitting unit 140 may transmit a foreign object sensing signal (S) in which a frequency of the driving power (Vac) is varied because the variable capacitor 134, the resonance capacitors (C1, C2, and C3), and the transmitting coils (L1, L2, and L3) have the second resonance value.

In this case, a capacitance value of the variable capacitor 134 may be lower than a capacitance value of the resonance capacitor (C1, C2, and C3).

Additionally, the variable capacitor 134 may compensate an imaginary part of impedance to measure a change in amounts of impedance of the transmitting coils (L1, L2, and L3) accurately. That is, the variable capacitor 134 is required for offsetting an imaginary part of impedance of the transmitting coils (L1, L2, and L3). When the wireless power receiving device 180 is charged, the switch 124 is used such that the variable capacitor 134 is not used.

The control module 150 may include an operation unit 152 and a foreign object sensing unit 154.

The operation unit 152 may control operations of the switching-on and switching-off of the switch 132. That is, the operation unit 152 may switch on the switch 132 such that a wireless power signal (P) is transmitted to the wireless power receiving device 180. Additionally, the operation unit 152 may switch off the switch 132 such that a foreign object sensing signal (S) for sensing a foreign object is transmitted.

When a foreign object sensing signal (S) is transmitted, the foreign object sensing unit 154 may sense an output voltage (Vout) corresponding to the foreign object sensing signal (S) between the resonance capacitor (C1, C2, and C3) and the transmitting coil (L1, L2, and L3).

The foreign object sensing unit 154 may sense a location of at least one of a foreign object and the wireless power receiving device 180 on the charging pad, based on the output voltage (Vout).

For instance, when the wireless power receiving device 180 is not placed on the charging pad, the operation unit 152 may switch off the switch 132 to confirm a location of at least one of the wireless power receiving device 180 and a foreign object on the charging pad.

In this case, the transmitting unit 140 transmits a foreign object sensing signal (S). Accordingly, the foreign object sensing unit 154 may sense the location of at least one of the wireless power receiving device 180 and a foreign object on the charging pad on the basis of an output voltage (Vout).

That is, when the wireless power receiving device 180 and a foreign object are not placed on the charging pad, the foreign object sensing unit 154 may set a reference voltage corresponding to a foreign object sensing signal (S). In this case, a setting unit (invisible) that may measure the set reference voltage and that may confirm the wireless power transmitting device is currently in a wait state may be added.

Then, when at least one of the wireless power receiving device 180 and a foreign object is placed on the charging pad, the foreign object sensing unit 154 senses a change in amounts of varying impedance. Additionally, the foreign object sensing unit 154 may confirm whether the output voltage (Vout) belongs to any one of the first to third reference ranges that are set with respect to a reference voltage, on the basis of the change in amounts of varying impedance. In this case, an output voltage (Vout) in the case in which a foreign object exists on the charging pad, an output voltage (Vout) in the case in which the wireless power receiving device 180 exists on the charging pad, and an output voltage (Vout) in the case in which a foreign object and the wireless power receiving device 180 all exists on the charging pad may be set respectively as the reference ranges.

A voltage in the first reference range is 0.55 times to 0.7 times as high as the reference voltage corresponding to the foreign object sensing signal (S).

A voltage in the second reference range is 0.71 times to 0.9 times as high as the reference voltage corresponding to the foreign object sensing signal (S).

A voltage in the third reference range is 0.91 times to 1.2 times as high as the reference voltage corresponding to the foreign object sensing signal (S).

Accordingly, the foreign object sensing unit 154 senses that the wireless power receiving device 180 is placed on the charging pad when an output voltage (Vout) belongs to the first reference range. The foreign object sensing unit 154 senses that a foreign object and the wireless power receiving device 180 are placed on the charging pad when an output voltage (Vout) belongs to the second reference range. The foreign object sensing unit 154 senses that a foreign object is placed on the charging pad when an output voltage (Vout) belongs to the third reference range.

When sensing that the wireless power receiving device 180 is placed on the charging pad, the foreign object sensing unit 154 may control the charging module 110 such that a wireless power signal (P) is transmitted.

When sensing that a foreign object and the wireless power receiving device 180 or a foreign object are placed on the charging pad, the foreign object sensing unit 154 may emit LED light outward. Additionally, the foreign object sensing unit 154 may cut off driving power (Vac) such that the charging module 110 does not transmit a wireless power signal (P).

A control module 150 according to embodiments is specifically described below with reference to FIG. 4.

FIGS. 3a to 3d are views illustrating a structure of the transmitting unit in FIG. 2.

Figure 3A:
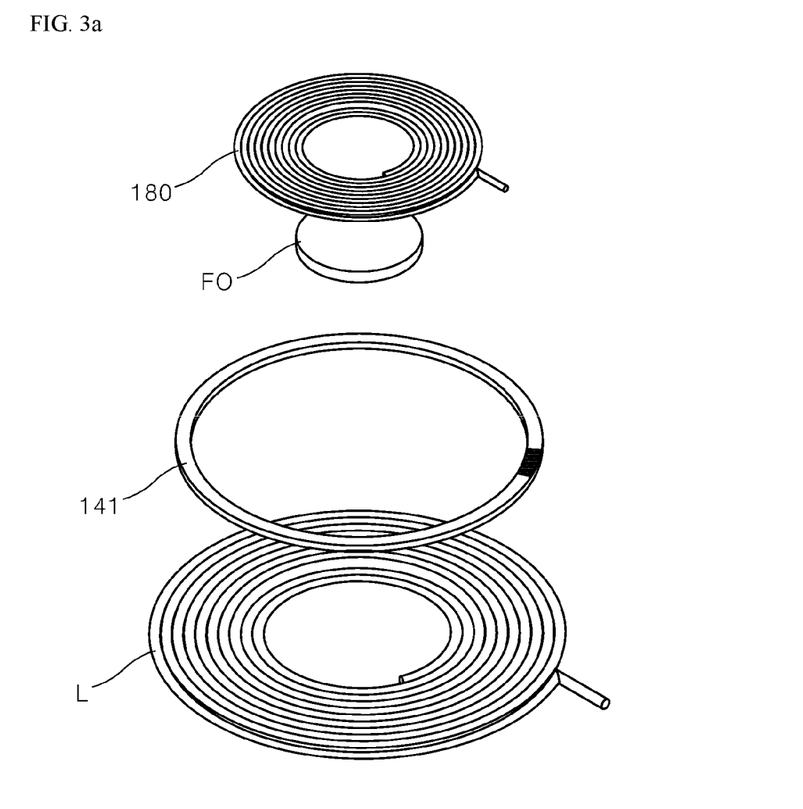
FIGS. 3a to 3d are views illustrating a structure of the transmitting unit in FIG. 2.
Figure 3B:
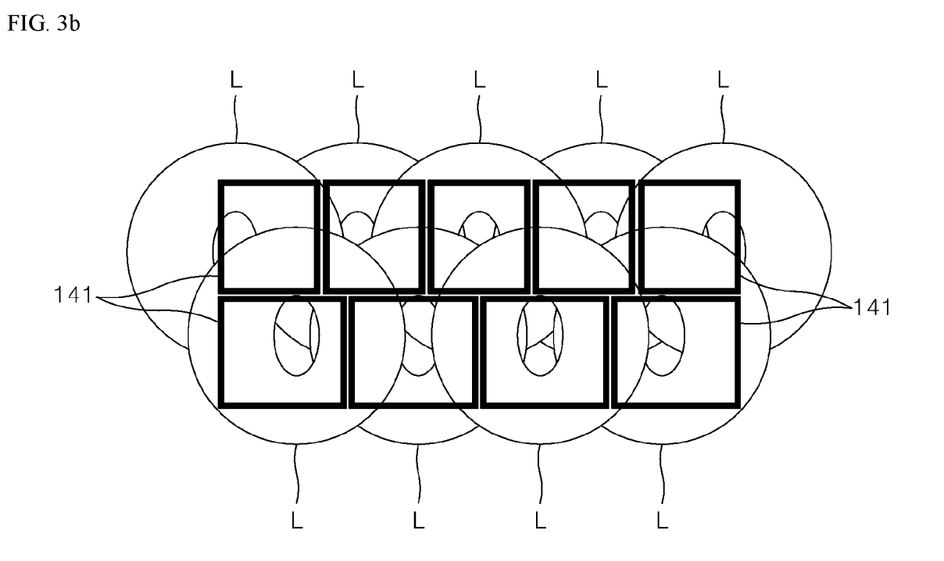
Figure 3C:
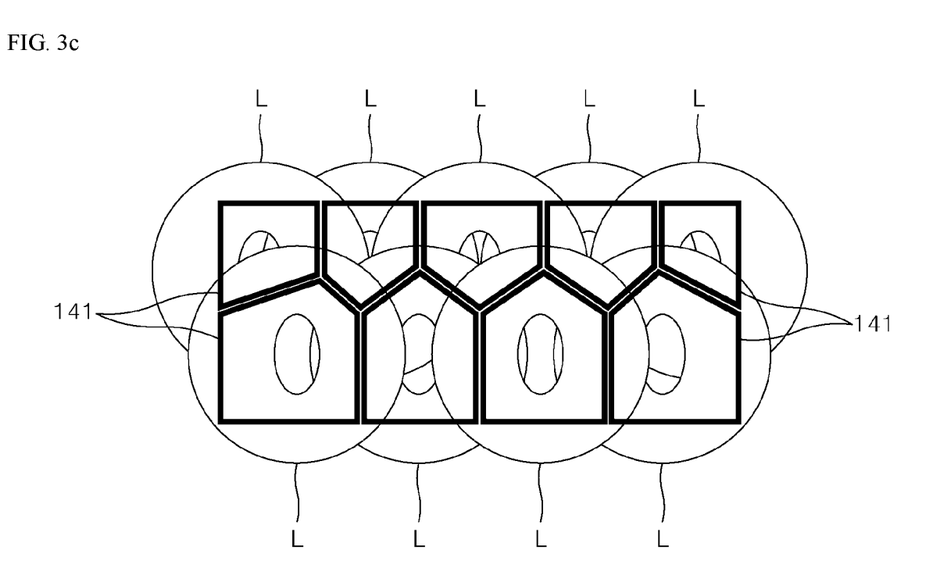
Figure 3D:
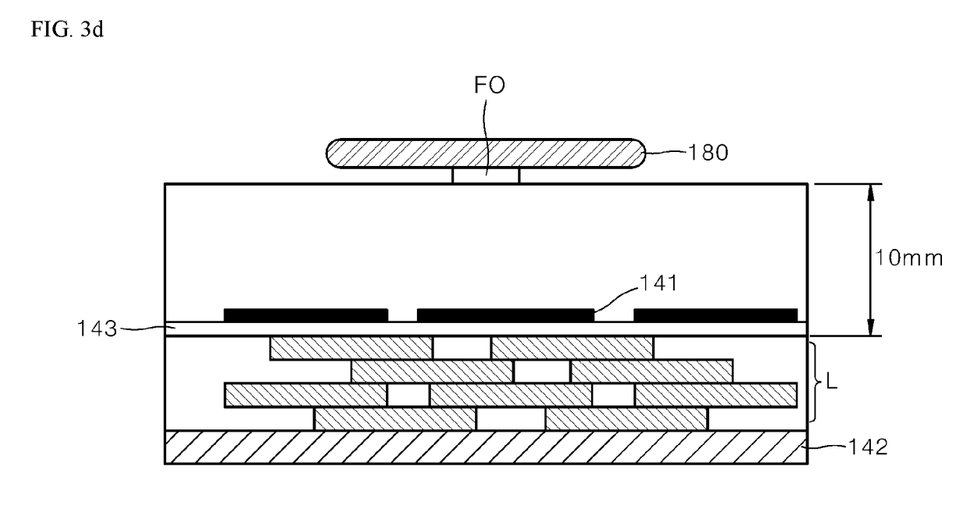

FIG. 3a is a view illustrating a structure in which a transmitting unit includes a transmitting coil and a resonance capacitor, and FIGS. 3b to 3d are views illustrating a structure in which a transmitting unit includes two or more transmitting coils and two or more resonance capacitors.

As illustrated in FIG. 3a, the transmitting unit 140 includes a resonance loop (C) between a transmitting coil (L), and a foreign object (FO) and a wireless power receiving device (receiving coil) 180. In this case, the resonance loop (C) may consist of resonance coils but is not limited to this. The resonance loop (C) may also consist of wire.

As described above, the transmitting unit 140 may additionally include the resonance loop 141 between the transmitting coil (L) and the wireless power receiving device (receiving coil) 180 to increase sensitivity to an output voltage (Vout). That is, when the transmitting unit 140 does not include the resonance loop 141, an actual value of measured impedance is very low, and a change in actual values of impedance measured by the transmitting coil (L) is very little. This makes it difficult for a foreign object sensing unit 154 to sense a change in amounts of varying impedance as a means to sense the wireless power receiving device 180 and a foreign object placed on a charging pad. That is, the foreign object sensing unit 154 is required to set output voltages (Vout) to first to third reference ranges on the basis of the change in amounts of varying impedance. However, it is difficult to divide the reference ranges because the change in amounts of impedance is little.

The resonance loop 141 may include a loop-structured resonance coil that concentrates detection signals generated in the transmitting coil, and a capacitor that allows a frequency to resonate at a specific frequency. As described above, the resonance loop consists of a resonance coil unlike a repeater coil.

The resonance coil has the effect of allowing high frequencies (a frequency about five times as high as a frequency of the repeater coil) to be used and concentrating a foreign object (FO) and the wireless power receiving device 180 placed on the charging pad on the resonance loop 141 while the repeater coil has the effect of improving a recognition distance. Thus, compensation for distances is possible. The resonance loop 141 has small values of inductance and capacitance and has a simple structure. Additionally, the resonance loop 141 may use high frequencies that do not affect the charging of the wireless power receiving device 180 when a foreign object (FO) is detected.

Further, the transmitting coil (L) and the resonance loop 141 may be provided on a one-to-one basis (1:1).

In FIG. 3a, the transmitting coil (L) and the resonance loop 141 have the shape of a ring. However, the shapes of the transmitting coil (L) and the resonance loop 141 are not limited. The transmitting coil (L) and the resonance loop 141 may have the shapes of an ellipse and a polygon.

As illustrated in FIGS. 3b to 3d, at least two or more transmitting coils (L) and resonance loops 141 may be provided.

In this case, at least two or more transmitting coils (L) may be placed on the same flat surface, and the transmitting coils may be cross-stacked in at least two or more layers. Adjacent transmitting coils (L) in the same layer are spaced apart from each other. Additionally, partial areas of the stacked transmitting coils (L) may be overlapped.

At least two or more resonance loops 141 may be placed on the same flat surface. The transmitting coil (L) and the resonance loop 141 may be provided on a one-to-one basis. In this case, a resonance loop 141 is placed not to be overlapped with an adjacent resonance loop 141. However, the position of the resonance loop 141 is not limited to what has been described. Partial areas of adjacent resonance loops 141 that are not connected to one another may be overlapped depending on an arrangement of the transmitting coils (L). When the resonance loops 141 are overlapped, the resonance loops 141 may be cross-stacked in at least two or more layers.

The transmitting coils (L) and the resonance loops 141 have the shape of a ring. However, the shapes of the transmitting coils (L) and the resonance loops 141 are not limited. The transmitting coils (L) and the resonance loops 141 may have the shapes of an ellipse and a polygon.

Referring back to FIG. 3d, the transmitting coils (L) are placed on a substrate 142. Additionally, an insulation film 143 is placed between the transmitting coil (L) and the resonance loop 141. In this case, the substrate 142 may consist of ferrite.

The transmitting unit 140 may include a charging pad that is placed above the resonance loop 141 and that has a thickness of 10 mm or less and preferably, a thickness of 7 mm or less. The charging pad has a thickness of 10 mm or less such that a change in amounts of impedance that is varied on the basis of the wireless power receiving device 180 and a foreign object on the charging pad may be effectively sensed.

FIGS. 3b to 3d illustrate an example of how the transmitting coils are arranged. However, the arrangement of the transmitting coils is not limited.

Figure 4:
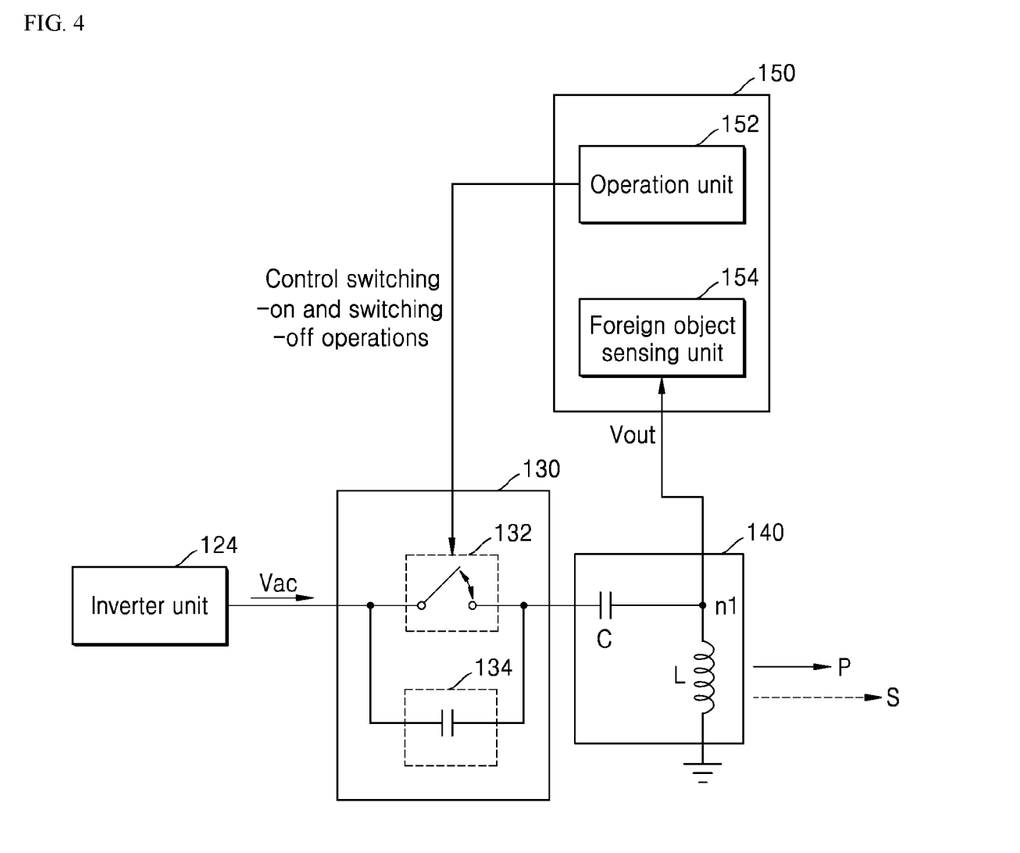
FIG. 4 is a circuit diagram briefly illustrating the resonance varying unit, the transmitting unit and the control module in FIG. 2.

FIG. 4 is a circuit diagram briefly illustrating the resonance varying unit, the transmitting unit and the control module in FIG. 2.

FIG. 4 illustrates a resonance varying unit 130 and a transmitting unit 140 that are included in a charging module 110.

Referring to FIG. 4, the resonance varying unit 130 may include a switch 132 and a variable capacitor 134. The switch 132 and the variable capacitor 134 may connect in parallel.

Driving power (Vac) that is output from an inverter unit 124 is input to one side of the resonance varying unit 130.

The switch 132, for instance, may include electronic switches such as a field-effect transistor (FET), an insulated gate bipolar transistor (IGBT), a bipolar junction transistor (BJT), a relay transistor and the like but is not limited to what has been described.

The switch 132 may switch on or switch off on the basis of control by an operation unit 152.

When the switch 132 switches off, the variable capacitor 134 and transmitting unit 140 may have a second resonance value, may vary frequencies of the driving power (Vac) and may allow a foreign object sensing signal (S) to be transmitted.

The variable capacitor 134 may vary a first resonance value to a second resonance value by capacitance coupling of a resonance capacitor (C) included in the transmitting unit 140 and by inductance of a transmitting coil (L).

The transmitting unit 140 may include a transmitting coil (L) and a resonance capacitor (C). In the embodiment, the transmitting coil (L) is at least one or more of the transmitting coils (L) in FIG. 2 and FIGS. 3a to 3d, and the resonance capacitor (C) is the resonance capacitors (C) (resonance loops (C)) in FIG. 2 and FIGS. 3a to 3d.

When the switch 132 switches on, the transmitting coil (L) and the resonance capacitor (C) resonate at a first resonance value. In this case, the transmitting coil (L) and the resonance capacitor (C) may transmit a wireless power signal (P) in which a frequency of driving power (Vac) is varied.

When the switch 132 switches off, the transmitting coil (L), the resonance capacitor (C) and the variable capacitor 134 resonate at a second resonance value. In this case, the transmitting coil (L), the resonance capacitor (C) and the variable capacitor 134 may transmit a foreign object sensing signal (S) in which a frequency of driving power (Vac) is varied.

A frequency of the foreign object sensing signal (S) may be higher than a frequency of a wireless power signal (P). That is, a frequency of the foreign object sensing signal (S) is higher than a frequency of the wireless power signal (P) by coupling of capacitance values of the variable capacitor 134 and the resonance capacitor (C).

The control module 150 may include an operation unit 152 and a foreign object sensing unit 154.

The operation unit 152 may switch on and switch off the switch 132. That is, when a wireless power receiving device 180 is not placed on a charging pad, the operation unit 152 may switch off the switch 132 and may transmit a foreign object sensing signal (S) for sensing the wireless power receiving device 180 and a foreign object on the charging pad.

Additionally, when the transmitting unit 140 transmits a wireless power signal (P) to charge the wireless power receiving device 180 on the charging pad, the operation unit 152 may allow the switch 132 to switch on and switch off at set time-period intervals. In this case, the transmitting coil (L) may repeat transmitting the wireless power signal (P) and the foreign object sensing signal (S).

The foreign object sensing unit 154 may sense whether at least one of the wireless power receiving device 180 and a foreign object is placed on the charging pad on the basis of an output voltage (Vout) that is sensed at a node point (n1) between the resonance capacitor (C) and the transmitting coil (L).

That is, the foreign object sensing unit 154 may sense at least one of the wireless power receiving device 180 and a foreign object, based on whether the output voltage (Vout) belongs to first to third reference ranges that are set.

In this case, each reference range is set on the basis of output voltages (Vout) in the case in which a foreign object is placed on the charging pad, in the case in which the wireless power receiving device 180 is placed on the charging pad, and in the case in which a foreign object and the wireless power receiving device 180 are all placed on the charging pad.

When the output voltage (Vout) belongs to the first reference range, the foreign object sensing unit 154 senses that the wireless power receiving device 180 is placed on the charging pad.

A voltage in the first reference range may be 0.55 times to 0.7 times as high as a reference voltage corresponding to the foreign object sensing signal (S). In this case, the output voltage (Vout) is reduced by mutual inductance between a receiving coil that is included in the wireless power receiving device 180, and the transmitting coil (L), and when the wireless power receiving device 180 is placed on the charging pad while being wirelessly charged, a voltage in the first reference range is 0.55 times to 0.7 times as high as a reference voltage.

When an output voltage (Vout) belongs to the second reference range, the foreign object sensing unit 154 senses that the wireless power receiving device 180 and a foreign object are placed on the charging pad.

A voltage in the second reference range may be 0.71 times to 0.9 times as high as the reference voltage corresponding to the foreign object sensing signal (S). That is, the output voltage (Vout) is 0.71 times to 0.9 times as high as the reference voltage reduced by mutual inductance between the receiving coil that is included in the wireless power receiving device 180 and the transmitting coil (L) and by resistance of the foreign object.

When an output voltage (Vout) belongs to the third reference range, the foreign object sensing unit 154 senses that a foreign object are placed on the charging pad.

A voltage in the third reference range may be 0.91 times to 1.2 times as high as the reference voltage corresponding to the foreign object sensing signal (S). That is, the output voltage (Vout) may increase to a voltage that is 0.91 times to 1.2 times or more as high as the reference voltage by resistance of the foreign object.

As described above, in the set reference ranges, output voltages in the second reference range are higher than those in the first reference range, and output voltages in the third reference range are higher than those in the second reference range.

The reference ranges that are set with respect to the reference voltage may vary depending on the number of the transmitting coils (L) of the transmitting unit 140 and depending on overlapped locations of the transmitting coils (L).

When sensing that a foreign object is placed on the charging pad, the foreign object sensing unit 154 may emit LED light outward but is not limited what has been described.

Figure 5:
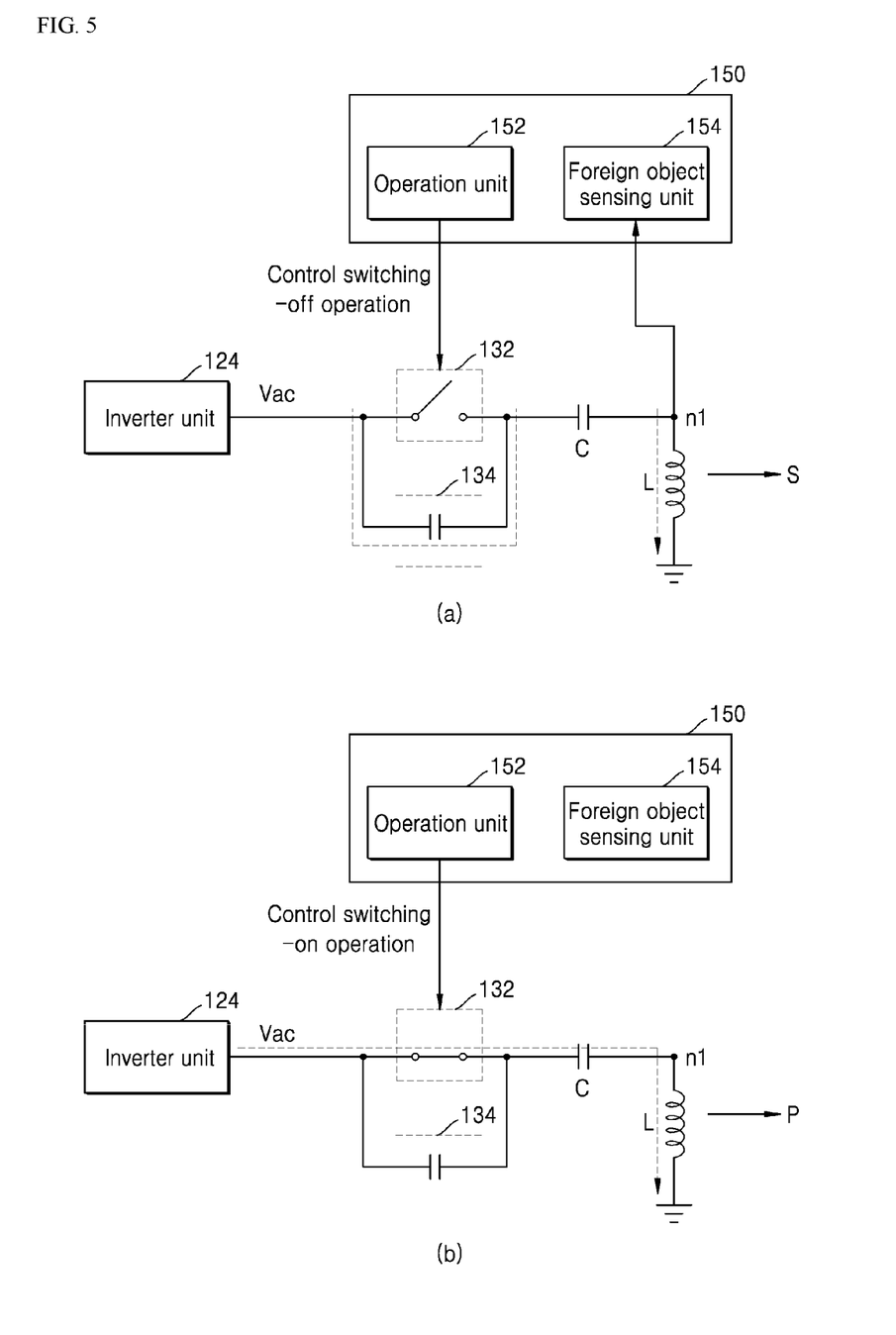
FIG. 5 is a circuit diagram illustrating operation of a circuit in a charging mode and in a sensing mode in the circuit diagram of FIG. 4.
Figure 6:
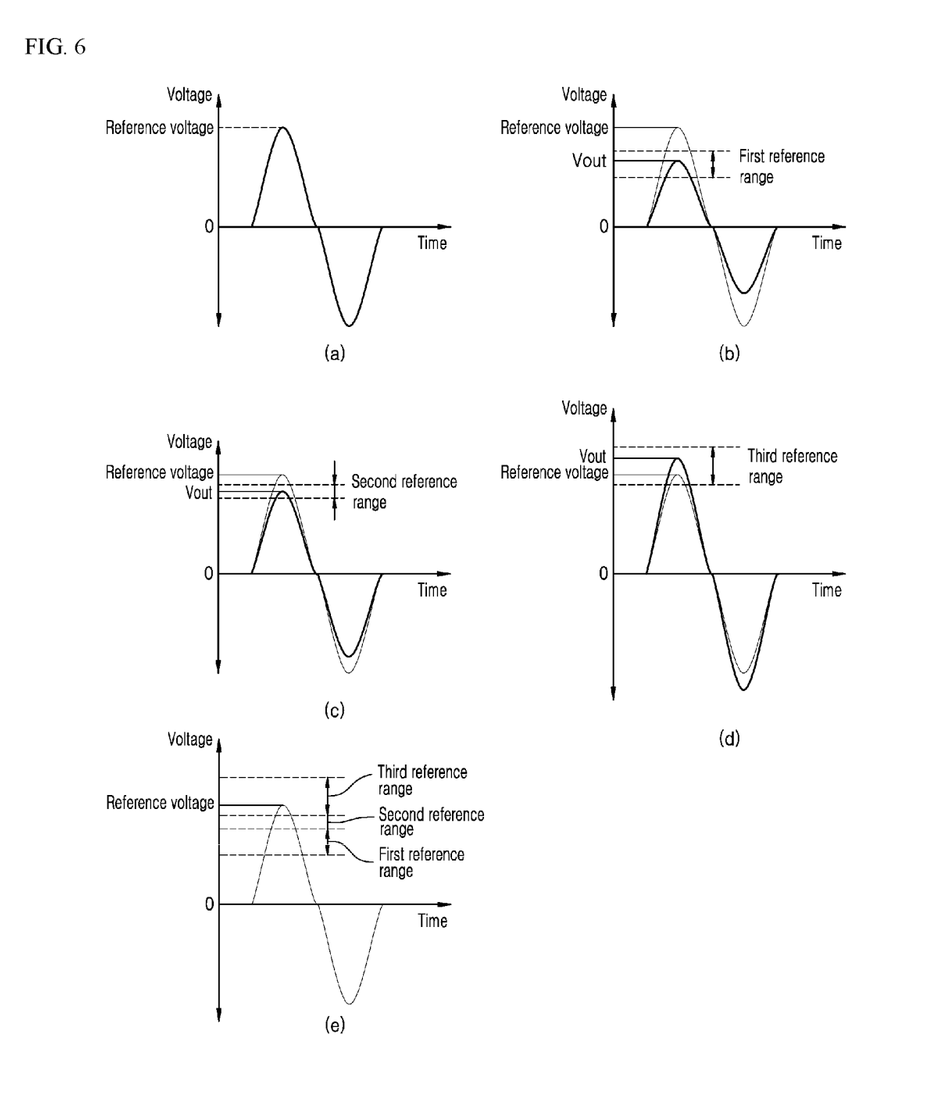
FIG. 6 is a waveform diagram of a voltage for explaining an output voltage and first to third reference voltage ranges at the node point in FIG. 4.

FIG. 5 is a circuit diagram illustrating operation of a circuit in a charging mode and in a sensing mode in the circuit diagram of FIG. 4, and FIG. 6 is a waveform diagram of a voltage for explaining an output voltage and first to third reference voltage ranges at the node point in FIG. 4.

FIG. 5(a) illustrates operation of a wireless power transmitting device in a sensing mode, and FIG. 5(b) illustrates operation of the wireless power transmitting device in a charging mode.

Referring to FIGS. 5(a) and 5(b), a control module 150 of a wireless power transmitting device 100 may operate in a charging mode and in a sensing mode.

In FIG. 5(a), the control module 150 may operate in a sensing mode to sense whether at least one of the wireless power receiving device 180 and a foreign object is placed on a charging pad.

That is, an operation unit 152 may switch off a switch 132 such that driving power (Vac) output from an inverter unit 124 in FIG. 2 is input to a variable capacitor 134 included in a resonance varying unit 130.

In this case, a transmitting unit 140 may vary from a first resonance value to a second resonance value by capacitance coupling of a resonance capacitor (C) and the variable capacitor 134 and by inductance of a transmitting coil (L). Accordingly, a foreign object sensing signal (S) may be transmitted from the transmitting coil (L).

A foreign object sensing unit 154 senses an output voltage (Vout) of the transmitting coil (L) at a node point (n1) and then confirms whether the output voltage belongs to any one of the first to third reference ranges.

When an output voltage (Vout) belongs to the first reference range, the foreign object sensing unit 154 senses that the wireless power receiving device 180 is placed on the charging pad.

When the foreign object sensing unit 154 senses that the wireless power receiving device 180 is placed on the charging pad, a mode of the operation unit 152, as illustrated in FIG. 5(b), is converted from a sensing mode into a charging mode. Then, after the mode of the operation unit 152 is converted into a charging mode, the operation unit 152 may switch on the switch 132 and may deliver driving power (Vac) output from the switching inverter unit 124 to the resonance capacitor (C) and the transmitting coil (L).

Next, the transmitting unit 140 may transmit a wireless power signal (P) corresponding to a first resonance value by capacitance of the resonance capacitor (C) and by inductance of the transmitting coil (L) and may charge the wireless power receiving device 180.

After a mode of the operation unit 152 is converted into a charging mode, the operation unit 152 may switch on and off the switch 132 by repeatedly converting a charging mode and a sensing mode at set time-period intervals, to sense whether a foreign object is placed on the charging pad while the wireless power receiving device 180 is being charged.

Next, the foreign object sensing unit 154 may sense a location of the foreign object on the basis of an output voltage (Vout) sensed at a node point (n1).

When an output voltage (Vout), sensed while the wireless power receiving device 180 is being charged, belongs to the second reference range, the foreign object sensing unit 154 may sense that a foreign object is additionally placed on the charging pad.

In this case, when the foreign object is placed on the charging pad, the foreign object sensing unit 154 may emit LED light outward.

Referring back to FIG. 5(a), when an output voltage (Vout) belongs to the third reference range, the foreign object sensing unit 154 may sense that a foreign object is only placed on the charging pad.

In this case, the foreign object sensing unit 154 emits LED light outward. The operation unit 152 switches on the switch 132 and operates the inverter unit 124 at set time-period intervals to maintain a sensing mode. Accordingly, driving power (Vac) is supplied to the variable capacitor 134.

As described above, the present disclosure may sense a location of a foreign object on the charging pad while the wireless power receiving device 180 is being charged.

The circuit diagram illustrating a resonance varying unit, a transmitting unit and a control module in FIG. 5 is only an example and is not limited.

FIG. 6(a) is a view illustrating a reference voltage corresponding to a foreign object sensing signal (S) when none of the wireless power receiving device 180 and the foreign object is on a charging pad, and FIG. 6(b) is a view illustrating an output voltage (Vout) and a reference voltage corresponding to a foreign object sensing signal (S) when a wireless power receiving device 180 is only placed on the charging pad.

As illustrated in FIG. 6(b), a foreign object sensing unit 154 may confirm whether an output voltage (Vout) belongs to a first reference range and may sense whether the wireless power receiving device 180 is placed on the charging pad.

FIG. 6(c) is a view illustrating an output voltage (Vout) and a reference voltage corresponding to a foreign object sensing signal (S) when the wireless power receiving device 180 and a foreign object are all placed on the charging pad.

As illustrated in FIG. 6(c), a foreign object sensing unit 154 may confirm whether an output voltage (Vout) belongs to a second reference range and may sense whether the wireless power receiving device 180 and a foreign object are all placed on the charging pad.

FIG. 6(d) is a view illustrating an output voltage (Vout) and a reference voltage corresponding to a foreign object sensing signal (S) when a foreign object is placed on the charging pad.

As illustrated in FIG. 6(d), a foreign object sensing unit 154 may confirm whether an output voltage (Vout) belongs to a third reference range and may sense whether a foreign object is placed on the charging pad.

FIG. 6(e) is a view briefly illustrating first to third reference ranges with respect to a reference voltage.

FIGS. 6(a) to 6(e) are views illustrating waveforms of time and output voltage corresponding to a foreign object sensing signal (S). However, a foreign object sensing unit 154 may confirm whether an output voltage belongs to first to third reference ranges in which output voltages are quantified and stored, using only a peak value of the output voltage (Vout) but is not limited to what has been described.

The present disclosure that is described above may be replaced, changed and modified in different ways by one having ordinary skill in the art to which the disclosure pertains without departing from the technical spirit of the disclosure. Thus, the disclosure should not be construed as being limited to the embodiments and the attached drawings set forth herein.

The invention claimed is:

1. A wireless power transmitting device, comprising:
a charging module configured to perform operations comprising:
transmitting a foreign object sensing signal that enables sensing of one or more objects on a charging pad, the one or more objects comprising at least one of a wireless power receiving device or a foreign object; and
transmitting a wireless power signal that enables charging of at least one wireless power receiving device located on the charging pad; and
a control module connected to the charging module and configured to perform operations comprising:
controlling the charging module to transmit the wireless power signal and the foreign object sensing signal; and
sensing at least one foreign object and at least one wireless power receiving device on the charging pad based on an output voltage that corresponds to the foreign object sensing signal transmitted by the charging module,
wherein the charging module comprises a switch configured to switch on and off to transmit the foreign object sensing signal and the wireless power signal, respectively, and
wherein the control module comprises:
an operation unit connected to the switch and configured to operate the switch to control a transmission of the wireless power signal and the foreign object sensing signal; and
a foreign object sensing unit configured to, based on the output voltage of the foreign object sensing signal sensed between a resonance capacitor and a transmitting coil of the charging module during a transmission of the foreign object sensing signal, sense a location of the at least one foreign object and the at least one wireless power receiving device on the charging pad.

2. The wireless power transmitting device of claim 1, wherein the charging module comprises:
a transmitting unit configured to perform operations comprising:
transmitting the wireless power signal and the foreign object sensing signal; and
resonating at a first resonance value corresponding to the wireless power signal to transmit the wireless power signal; and
a resonance converting unit configured to change the first resonance value to a second resonance value to transmit the foreign object sensing signal.

3. The wireless power transmitting device of claim 2, wherein the transmitting unit comprises:
the transmitting coil placed on a substrate; and
a resonance loop placed between the transmitting coil and a surface of the charging pad on which the at least one wireless power receiving device is located.

4. The wireless power transmitting device of claim 3, wherein the resonance loop comprises:
a loop-structured resonance coil configured to concentrate signals generated in the transmitting coil; and
a capacitor configured to resonate at a specific frequency.

5. The wireless power transmitting device of claim 4, wherein the resonance coil is configured to resonate at a first range of frequencies higher than a second range of frequencies at which the transmitting coil resonates, the first range of frequencies enabling charging of the at least one wireless power receiving device when the at least one foreign object is detected on the charging pad with the at least one wireless power receiving device.

6. The wireless power transmitting device of claim 3, wherein the resonance converting unit comprises:
the switch; and
a variable capacitor connected with the switch in parallel and configured to change the first resonance value to the second resonance value based on the switch being off.

7. The wireless power transmitting device of claim 6, wherein the variable capacitor has a first capacitance value lower than a second capacitance value of a resonance capacitor.

8. The wireless power transmitting device of claim 6, wherein the operation unit is configured to control the switch to cause a transmission of one of the wireless power signal and the foreign object sensing signal at set time-period intervals.

9. The wireless power transmitting device of claim 6, wherein, based on the foreign object sensing unit sensing the at least one wireless power receiving device located on the charging pad, the operation unit is further configured to:
control the switch to transmit the wireless power signal; and repeat switching on and off the switch at set time-period intervals to sense the at least one foreign object on the charging pad.

10. The wireless power transmitting device of claim 6, wherein the foreign object sensing unit is configured to set reference ranges based on output voltages that correspond to following cases:
   a first reference range where the at least one wireless power receiving device is located on the charging pad;
   a second reference range where the at least one foreign object and the at least one wireless power receiving device are located on the charging pad; and
   a third reference range where the at least one foreign object is located on the charging pad.

11. The wireless power transmitting device of claim 10, wherein output voltages in the second reference range are higher than output voltages in the first reference range, and output voltages in the third reference range are higher than output voltages in the second reference range.

12. The wireless power transmitting device of claim 1, wherein the foreign object sensing unit is further configured to:
   emit LED light when sensing at least one wireless power receiving device and at least one foreign object; and
   emit LED light when sensing at least one foreign object.

13. The wireless power transmitting device of claim 6, wherein the operation unit is further configured to operate the switch to prevent a transmission of the wireless power signal based on the at least one foreign object being sensed by the foreign object sensing unit.

14. The wireless power transmitting device of claim 10, wherein the foreign object sensing unit is further configured to sense that the at least one wireless power receiving device is located on the charging pad based on the output voltage of the foreign object sensing signal belonging to the first reference range.

15. The wireless power transmitting device of claim 14, wherein the output voltage in the first reference range is 0.55 times to 0.7 times as high as a reference voltage corresponding to the foreign object sensing signal.

16. The wireless power transmitting device of claim 10, wherein the foreign object sensing unit is further configured to sense that the at least one wireless power receiving device and the at least one foreign object are located on the charging pad based on the output voltage of the foreign object sensing signal belonging to the second reference range.

17. The wireless power transmitting device of claim 16, wherein the output voltage in the second reference range is 0.71 times to 0.9 times as high as a reference voltage corresponding to the foreign object sensing signal.

18. The wireless power transmitting device of claim 10, wherein the foreign object sensing unit is further configured to sense that the at least one foreign object is located on the charging pad based on the output voltage of the foreign object sensing signal belonging to the third reference range.

19. The wireless power transmitting device of claim 18, wherein the output voltage in the third reference range is 0.91 times to 1.2 times as high as a reference voltage corresponding to the foreign object sensing signal.

\* \* \* \* \*